UNITED STATES PATENT OFFICE.

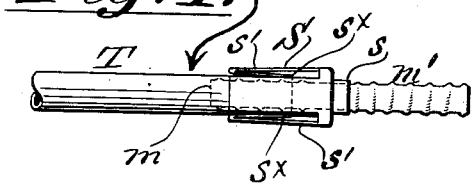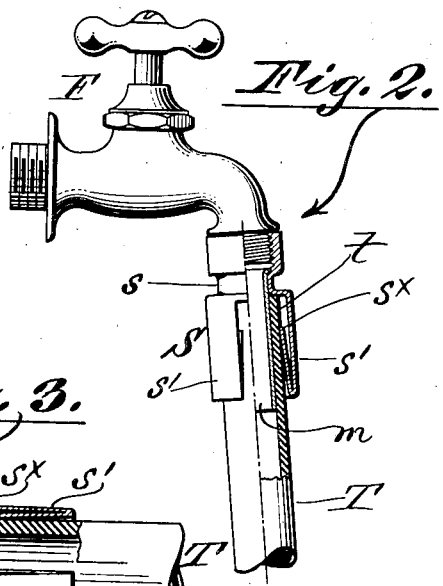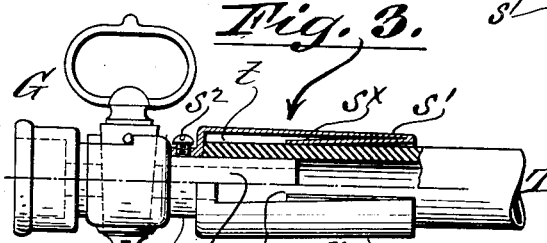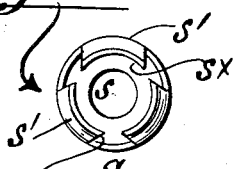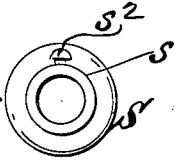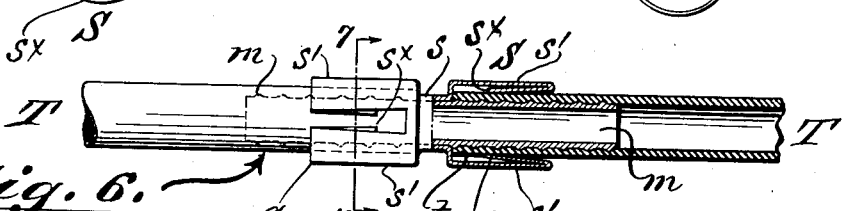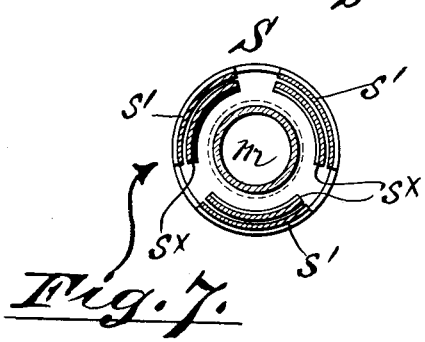

GOTTLOB KLUMPP, OF NEW YORK, N. Y.

HOSE-COUPLING.

1,386,260.   Specification of Letters Patent.   Patented Aug. 2, 1921.

Application filed January 31, 1920. Serial No. 355,495.

*To all whom it may concern:*

Be it known that I, GOTTLOB KLUMPP, a citizen of Germany, having declared my intention of becoming a citizen of the United States, and a resident of the borough of Manhattan, city, county, and State of New York, have invented a certain new and useful Hose-Coupling, of which the following is a specification.

The object of my invention is to afford an effective coupling device for flexible (so called rubber) hose used for fluids, both liquid and gaseous, a device that may be expeditiously and conveniently applied for immediate use, and that will obviate all danger of accidental displacement or leakage in so far as it is concerned.

The invention consists in the specific construction and arrangement of parts described and claimed, a distinctive feature being the formation of a coupling socket or sleeve, for the reception of a hose end, with a plurality of inturned elastic resilient clamping jaws which yield to the insertion of the hose but which effectually bind it against retractile movement, all as hereinafter fully set forth.

In the accompanying drawings,

Figure 1, is an elevation of a single socket for small hose made in accordance with my invention;

Fig. 2, is a sectional elevation of a coupling embodying my invention adapted for use in conjunction with a faucet for liquids;

Fig. 3, is a sectional elevation, practically full size, showing my invention as adapted for use in connection with a gas cock or the like;

Fig. 4, is a mouth end elevation of the coupling piece shown in Fig. 3;

Fig. 5, is a shank end view of the same;

Fig. 6, is a sectional elevation showing a duplex form of coupling adapted for use as jointure between hose ends;

Fig. 7, is a transverse section, upon a larger scale, taken upon plane of line 7—7, Fig. 6, the tubing being omitted.

As illustrated in the drawings, the essential features of my invention are applicable to various uses and to different forms of hose couplings or connections, so that by the term "coupling" as employed herein I mean to designate any hose attaching-device by means of which a hose end may be connected with a fixture, such as a faucet, gas cock, or the like, or whereby two hose ends may be united, according to circumstances and requirements. Thus, Figs. 2 and 3, show my coupling as adapted for use as a means of attaching hose to a source of fluid supply, whereas the other views illustrate its use as a connection between sections of hose.

In its simplest form, shown in Figs. 3, 4 and 5, my coupling comprises only a socket S, formed with a shank $s$, provided with a set screw $s^2$, or equivalent, by means of which it may be rigidly attached to the spout $g$ of a gas cock G, as in Fig. 3, in which case said spout $g$, performs the function of a mandrel for the support of the end $t$, of the rubber tubing T,—such internal support being essential in order to afford the requisite resistance to the pressure of the spring jaws $s^x$, of the socket S, to enable said spring jaws $s^x$, to pinch and hold the rubber tubing.

The socket S, is essentially a sleeve consisting of a plurality of substantially parallel arms $s'$, extending from the shank or base $s$, the free ends of said arms $s'$, being inversely inturned to form the aforesaid spring jaws $s^x$, as shown in Figs. 1, 2, 3, 4, 6 and 7, it being noted that the spring jaws $s^x$, are adapted to function as barbs which yield to admit of the insertion of the hose but prevent its withdrawal by ordinary means since they compress the part of the hose contacted with against the mandrel-like section of rigid tubing over which the end $t$, of the rubber tubing is forced during its insertion into the coupling.

As before stated in referring to Figs. 3, 4 and 5, this mandrel like protrusion into the end $t$, of the rubber hose T, may consist of the spout of a gas or other cock, but otherwise it constitutes a component part of the coupling device itself, as in all of the other figures of the drawings, in which the mandrel tube $m$, forms the base on which the socket S, is rigidly mounted. Thus, even in Fig. 2, in which the shank $s$, of the socket S, is formed with screw means for attachment to the screw-threaded spout of a faucet F, the mandrel tube $m$, is united integrally with said shank $s$, and sleeve S, or is essentially a constituent part thereof, being provided solely for the purpose of affording internal support for the end $t$, of the rubber tubing T, as against the pressure exerted by the spring jaws $s^x$, against the peripheral surface of the said tubing.

Where the mandrel tube $m$, forms the core, as it were, of the coupling device as in all but Figs. 3, 4 and 5, of the drawings, it is preferably made to extend beyond the mouth end of the sleeve S, so as to support the hose internally well beyond the sleeve and thereby obviate all danger of collapse of tubing adjacent to the coupling joint. By this means, also, bruised or flattened hose may be opened up and made operative, where it would not otherwise be available for its full capacity.

In Fig. 1, the mandrel tube $m$, is shown as formed with a rear extension $m'$, for permanent attachment to tubing by binding means in a manner well known in the art,— the mandrel tube $m$, and socket sleeve S, affording the means for temporary attachment with the auxiliary hose T,—it being understood that if sufficient force is used the end $t$, of the rubber tubing T, may be extracted from between the spring jaws $s^x$, but such force would have to be extraordinary, and far beyond the strain to which the tubing etc., would be subjected to under ordinary conditions of use.

At least two spring jaws $s^x$, are essential for the practical utility of the socket sleeve S, and three is the preferable number as shown, positioned in equi-distant relationship, so as to render the pressure upon the end $t$, of the tubing T, uniform circumferentially. I do not however limit myself to the use of three spring jaws $s^x$, as more may be found desirable in certain contingencies.

When the device is designed primarily and simply as a means for uniting adjoining ends of sections of rubber tubing, I make it of duplex character, as illustrated in Fig. 6; otherwise the coupling means is essentially the same in all cases. Its merits are its simplicity, and the facility with which it may be adjusted for use, as well as the internal support afforded to the tubing.

It is to be understood that the socket sleeve S, is made of elastic resilient material, preferably metallic, and that the mandrel tube $m$, is necessarily of rigid structure.

What I claim as my invention and desire to secure by Letters Patent is,

1. A hose coupling of the character designated, comprising a socket sleeve consisting of a plurality of longitudinally extending arms each bent upon itself to form an inturned spring barb jaw, and means for attaching said socket sleeve to a fluid conduit, for the purpose described.

2. A hose coupling of the character designated, comprising a plurality of longitudinally extending arms each bent upon itself to form an inturned spring barb jaw, a mandrel tube, and means for attachment to a fluid conduit, for the purpose described.

3. A hose coupling of the character designated, comprising duplex socket sleeves formed with a shank common to both, each socket sleeve formed with a plurality of longitudinally extending arms each bent upon itself to form an inturned spring barb jaw, and a mandrel tube extending through both of said socket sleeves, for the purpose described.

GOTTLOB KLUMPP.

Witnesses:
GEO. WM. MIATT,
MADELINE A. JACOBSON.